(12) United States Patent
Ma et al.

(10) Patent No.: US 7,452,033 B2
(45) Date of Patent: Nov. 18, 2008

(54) STRUCTURE FOR MOVEMENT OF REAR CATCH OF DOUBLE FOLDING SEAT FOR VEHICLE

(75) Inventors: Chae Hoon Ma, Gyeonggi-do (KR); Chan Ho Jeong, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/763,660

(22) Filed: Jun. 15, 2007

(65) Prior Publication Data

US 2008/0136243 A1    Jun. 12, 2008

(30) Foreign Application Priority Data

Dec. 6, 2006    (KR) .................. 10-2006-0123070

(51) Int. Cl.
*B60N 2/10* (2006.01)
(52) U.S. Cl. ............... 297/336; 297/335; 296/65.05
(58) Field of Classification Search ............ 297/336, 297/335, 332; 296/65.05, 65.09
See application file for complete search history.

(56) References Cited

U.S. PATENT DOCUMENTS

| 6,135,555 A | 10/2000 | Liu et al. |
| 6,648,393 B1 | 11/2003 | Milnar et al. |
| 6,685,269 B1 | 2/2004 | Freijy et al. |

FOREIGN PATENT DOCUMENTS

| JP | 08-067186 | 3/1996 |
| JP | 10-181392 | 7/1998 |
| KR | 1020050044940 | 5/2005 |
| KR | 1020050103630 | 11/2005 |
| KR | 1020060055568 | 5/2006 |

*Primary Examiner*—David R Dunn
*Assistant Examiner*—Patrick D Lynch
(74) *Attorney, Agent, or Firm*—Morgan Lewis & Bockius LLP

(57) ABSTRACT

A structure for movement of a rear catch of a double folding seat for a vehicle. The seat includes a seat frame with a front mounting structure which is fixed by a hinge coupling part including a front catch; and a rear mounting structure, including a striker, and a rear catch that is attachable to and detachable from the striker. The rear catch is movable in a lateral direction of the vehicle along connecting bars. A cable has a first end connected to the rear catch, and a second end attached to a leg frame that rotates during folding of the seat. A moving operation part connects the leg frame to the connecting bars. During folding of the seat, the cable pulls the rear catch inward and away from the door frame, providing more space for loading and unloading of the vehicle.

6 Claims, 4 Drawing Sheets

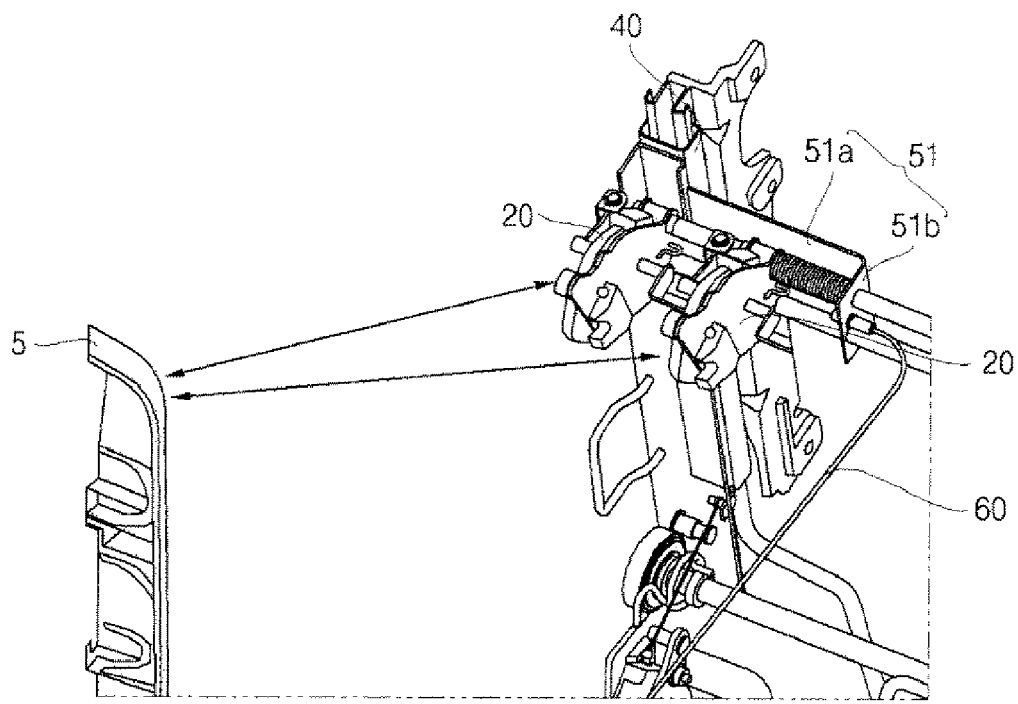

STRUCTURE FOR MOVEMENT OF REAR CATCH OF DOUBLE FOLDING SEAT FOR VEHICLE

CROSS-REFERENCE TO RELATED APPLICATION

This application claims priority to and the benefit of Korean Patent Application No. 10-2006-0123070 filed in the Korean Intellectual Property Office on Dec. 6, 2006, the entire contents of which are incorporated herein by reference.

BACKGROUND OF THE INVENTION (a) Field of the Invention

The present invention relates to a structure for movement of a rear catch of a double folding seat for a vehicle, and more particularly to a structure for moving a rear catch away from a quarter trim to provide more loading/unloading space.

(b) Description of the Related Art

A typical double folding seat includes a hinge at a front part of a seat frame, and a rear mounting structure using a striker and a rear catch that can be released from the striker to fold the rear part of the seat forward.

Even with a second-row seat in such a folded configuration, it acts as an obstacle to passengers getting in to or out of third-row seats. The rear catch is a particular problem as it is so close to the quarter trim.

SUMMARY OF THE INVENTION

The present invention provides a structure for movement of a rear catch of a double folding seat for a vehicle that moves a rear catch away from a quarter trim while the seat is being folded.

An exemplary embodiment of the present invention provides a structure for movement of a rear catch of a double folding seat for a vehicle. The seat includes a seat frame with a front mounting structure which is fixed by a hinge coupling part including a front catch; and a rear mounting structure, including a striker, and a rear catch that is attachable to and detachable from the striker. The structure includes one or more connecting bars. The rear catch is movable along the connecting bars in a lateral direction of the vehicle. A cable has a first end connected to the rear catch, and a second end attached to a leg frame that rotates during folding of the seat. A moving operation part connects the leg frame to the connecting bars.

The moving operation part may include a movement limit bracket mounted to the leg frame so as to limit movement of the rear catch; a return spring mounted to the connecting bar between the rear catch and the movement limit bracket so as to return the rear catch to an original state thereof when the seat is unfolded; and a bushing connected to the connecting bars so as to make the rear catch smoothly move on the connecting bars.

A projection may be provided on an inner surface of the bushing to reduce contact surface between the connecting bar and the bushing.

The cable may pass through the movement limit bracket and be fixed to the rear catch such that the cable is movable in the lateral direction.

A direction change bracket may be fixed to the front catch of the hinge coupling part, such that a direction of the cable can be changed.

BRIEF DESCRIPTION OF THE DRAWINGS

FIG. 5 is a drawing showing the difference in size of a gap between a quarter trim and a latch structure of an exemplary embodiment of the present invention compared with a conventional latch structure.

Figure 1:
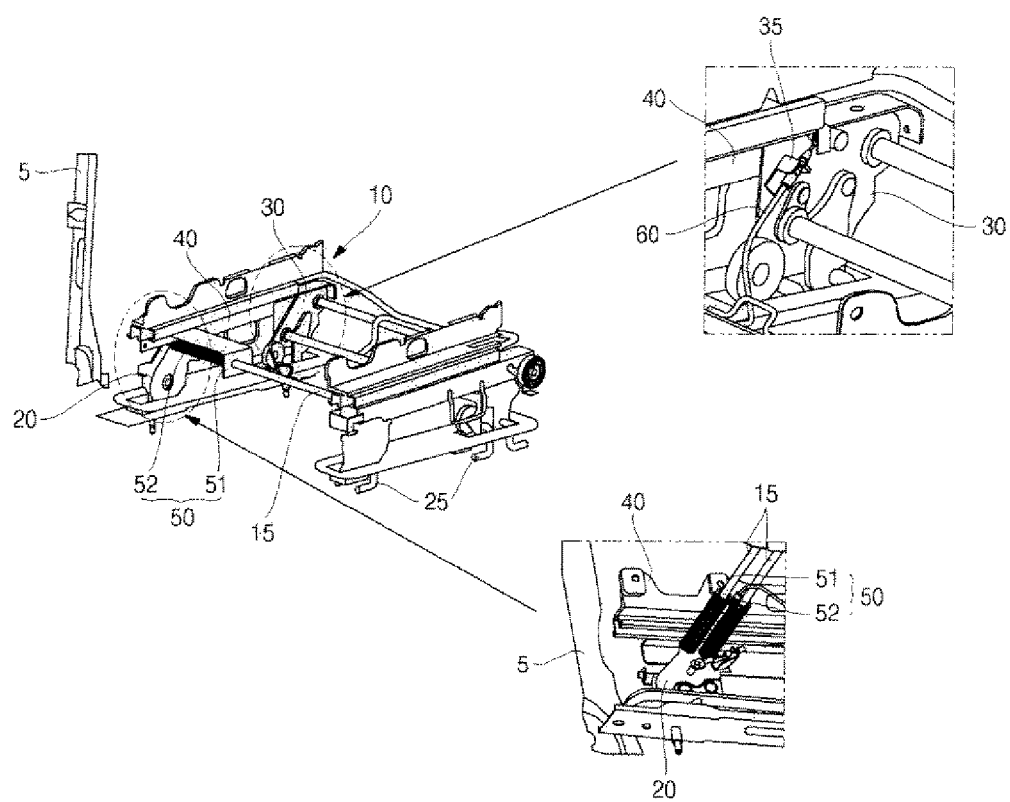
FIG. 1 and FIG. 2 are perspective views respectively showing states before and after an operation of a structure for movement of a rear catch of a double folding seat for a vehicle according to an exemplary embodiment of the present invention.
Figure 2:
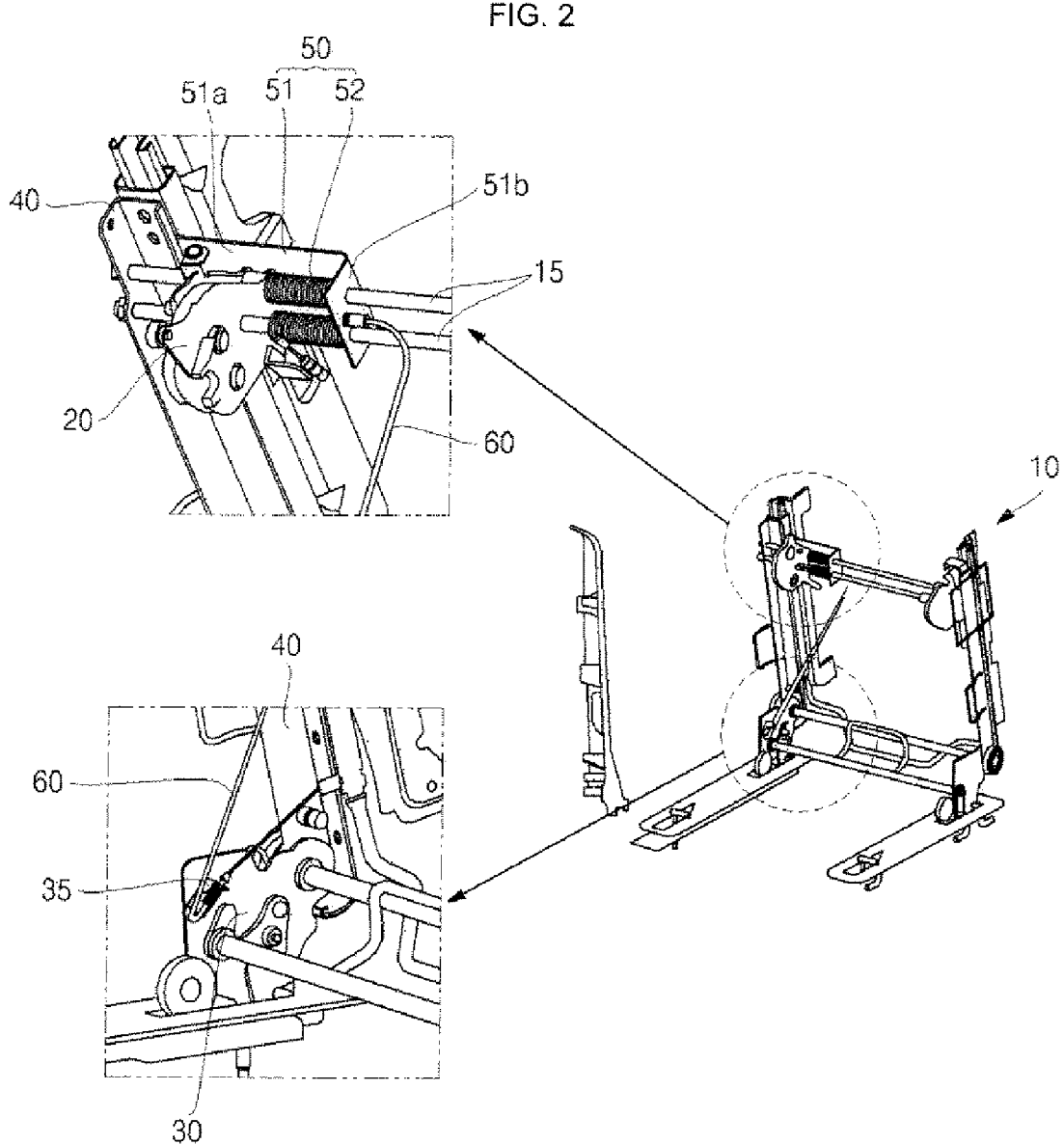
Figure 3:
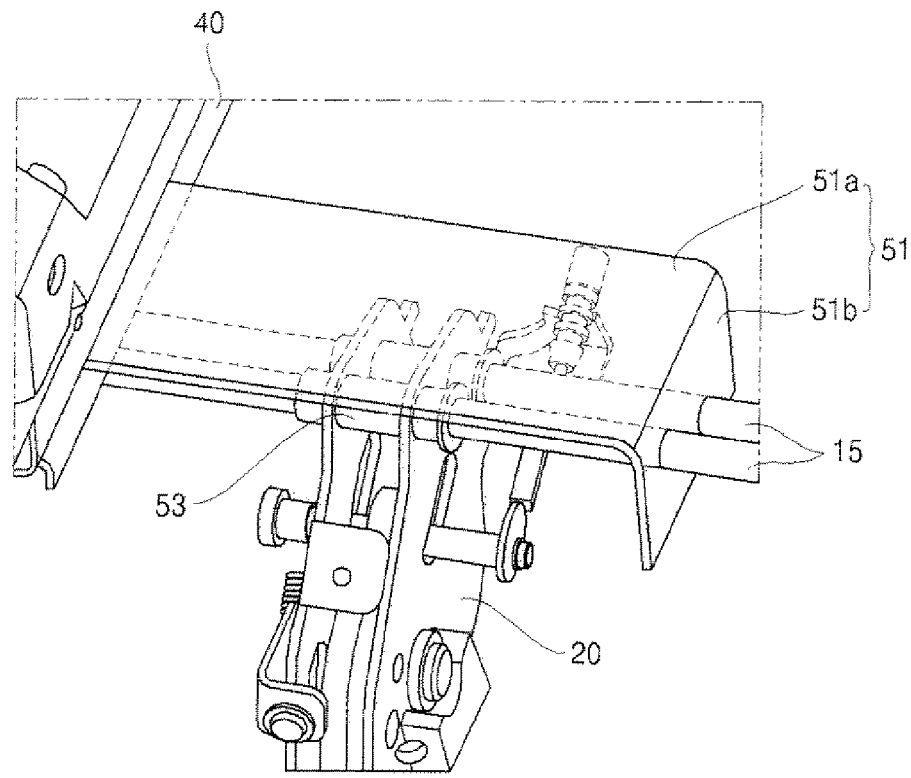
FIG. 3 is a perspective view of a moving operation part of a structure for movement of a rear catch of a double folding seat for a vehicle according to an exemplary embodiment of the present invention.

Description of Reference Numerals Indicating Primary Elements in the Drawings

| | |
|---|---|
| 5: quarter trim | 10: seat frame |
| 15: connection bar | 20: rear catch |
| 25: striker | 30: front catch |
| 35: direction change bracket | 40: leg frame |
| 50: moving operation part | 51: movement limit bracket |
| 52: return spring | 53: bushing |
| 60: cable | |

DETAILED DESCRIPTION OF THE PREFERRED EMBODIMENTS

An exemplary embodiment of the present invention will hereinafter be described in detail with reference to the accompanying drawings.

As shown in FIG. 1, a seat frame 10 of a double folding seat 100 according to an exemplary embodiment of the present invention includes a front mounting structure, a front part of which is fixed by a hinge coupling part including a front catch 30. The seat frame 10 also includes a rear mounting structure with a rear catch 20 and a striker 25. The rear mounting structure is locked and unlocked in response to user manipulation of a lever (not shown).

To obtain sufficient space for getting in or out of third-row seats, the rear catch 20 moves in the lateral direction of the vehicle using a cable 60, which is pulled by rotation of the front catch 30 and a leg frame 40 of the hinge coupling part.

Accordingly, in an exemplary embodiment of the present invention, the rear catch 20 is configured to be movable in the lateral direction. As shown in the drawings, a moving operation part 50 of the rear catch 20 connects the leg frames 40 with a pair of connecting bars 15. The rear catch 20 is slidably mounted on the connecting bar 15.

Each seat has two rear catches 20; the moving operation part 50 is provided to the rear catch 20 which is closer to a quarter trim 5.

The rear catch 20 is unlocked from the striker 25 in response to user manipulation of a lever (not shown) when the seat 100 is double folded.

Movement of the rear catch 20 is limited by connecting bar 15 between the rear catch 20 and a movement limit bracket 51 having a horizontal surface 51a and a vertical surface 51a which are connected to the leg frame 40. A return spring 52 is provided so that the rear catch 20 elastically returns to its original state when the seat 100 returns to its original state.

Two return springs 52 may be provided: one mounted to each connecting bar 15.

Figure 4:
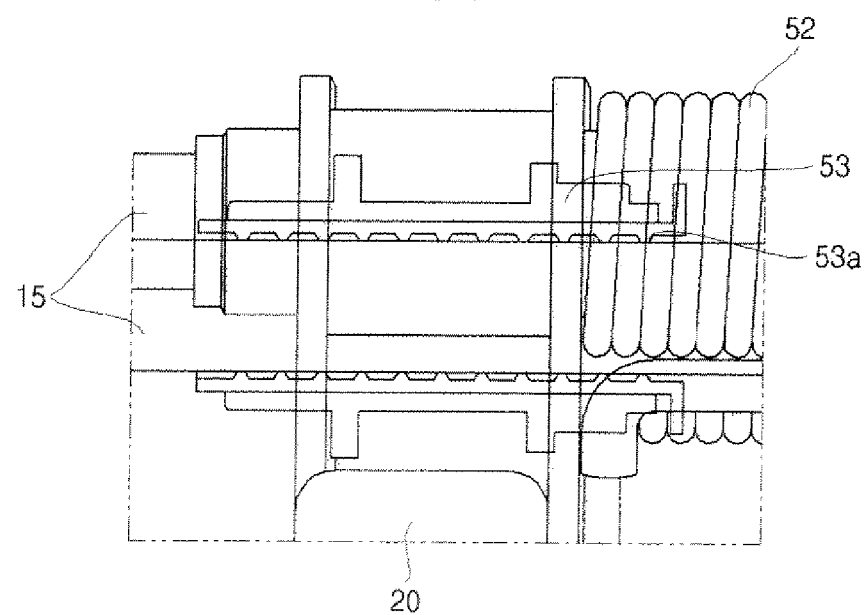
FIG. 4 is a side view of a moving operation part of a structure for movement of a rear catch of a double folding seat for a vehicle according to an exemplary embodiment of the present invention.

The rear catch 20 moves smoothly along the connecting bar 15 by a bushing 53, and as shown in FIG. 4, projections 53*a* are provided at constant intervals on an inner surface of the bushing 53 so as to further reduce the area contacting the connecting bar 15, thereby minimizing friction force.

The cable 60 is connected to the moving operation part 50, including the rear catch 20. The cable 60 further passes through the vertical surface 51*b* of the movement limit bracket 51, and is fixed to a side surface of the rear catch 20.

Accordingly, when the cable 60 is pulled, the rear catch 20 moves in the same direction as the cable 60, so that the rear catch 20 can easily move on the connecting bar 15.

As such, the cable 60 is connected to the front mounting structure including the hinge coupling part, and is connected to a side surface of the front leg frame 40 via a direction change bracket 35, which is fixed to the front catch 30 of the hinge coupling part, and is configured such that the cable 60 changes direction while passing therethrough.

Accordingly, to achieve double folding of the seat 100, a seat back 110 is forwardly folded relative to a lower part of a seat cushion 120, the rear catch 20 is unlocked from the striker 25, and the seat cushion 120 is folded forward. In this case while the fixing point of the cable 60 to the leg frame 40 moves farther from the moving operation part 50, i.e., while the leg frame 40 rotates, the cable 60 is pulled forward.

The cable 60, which is pulled in a forward direction through the direction change bracket 35, pulls the rear catch 20, and thereby the rear catch 20 is pulled toward the inside of the seat 100, i.e., toward the inside of the passenger compartment, along the connecting bar 15.

As such, a gap between the quarter trim 5 and the rear catch 20 is increased so as to maximize a space for getting in and getting out of a third-row seat (not shown).

This is shown in FIG. 5, and the gap is increased from 280 mm in the conventional structure to 380 mm.

Accordingly, in a structure for movement of a rear catch of a double folding seat for a vehicle according to an exemplary embodiment of the present invention, a latch structure of a second-row double folding seat 100, which may otherwise interfere with a passenger during getting in and getting out of a third-row seat (not shown) is moved toward the inside of the vehicle so as to enlarge a space for getting in and getting out.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A structure for movement of a rear catch of a double folding seat for a vehicle, the seat comprising a seat frame with a front mounting structure which is fixed by a hinge coupling part including a front catch, and a rear mounting structure comprising a striker and a rear catch that is attachable to and detachable from the striker, the structure comprising:
    one or more connecting bars, wherein the rear catch is movable along the one or more connecting bars in a lateral direction of the vehicle;
    a cable comprising a first end connected to the rear catch and a second end attached to a leg frame that rotates during folding of the seat;
    a moving operation part, connecting the leg frame to the connecting bars; and
    wherein the cable causes the lateral movement of the rear catch along the one or more connecting bars.

2. The structure of claim 1, wherein the moving operation part comprises:
    a movement limit bracket mounted to the leg frame so as to limit movement of the rear catch;
    a return spring mounted to the connecting bar between the rear catch and the movement limit bracket so as to return the rear catch to an original state thereof when the seat is unfolded; and
    a bushing connected to the connecting bars so as to make the rear catch smoothly move on the connecting bars.

3. The structure of claim 2, wherein the cable passes through the movement limit bracket and is fixed to the rear catch such that the cable is movable in the lateral direction.

4. The structure of claim 1, further comprising a direction change bracket fixed to the front catch of the hinge coupling part, whereby a direction of the cable can be changed.

5. The structure of claim 2, wherein the one or more connecting bars comprise at least two connecting bars; and the return spring comprises a return spring on each connecting bar.

6. The structure of claim 2, further comprising a projection on an inner surface of the bushing so as to reduce contact surface between the connecting bar and the bushing.

* * * * *